United States Patent
Rutledge et al.

(10) Patent No.: US 9,317,455 B2
(45) Date of Patent: Apr. 19, 2016

(54) VIRTUAL SWITCHING OF INFORMATION HANDLING DEVICE COMPONENTS

(75) Inventors: James S. Rutledge, Durham, NC (US);
Seiichi Kawanao, Kanagawa-ken (JP);
Steven R. Perrin, Raleigh, NC (US);
Scott E. Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 123 days.

(21) Appl. No.: 13/343,862

(22) Filed: Jan. 5, 2012

(65) Prior Publication Data

US 2013/0179611 A1 Jul. 11, 2013

(51) Int. Cl.
*G06F 13/12* (2006.01)
*G06F 13/38* (2006.01)

(52) U.S. Cl.
CPC ............ *G06F 13/12* (2013.01); *G06F 13/385* (2013.01)

(58) Field of Classification Search
CPC ....... G06F 3/023; G06F 3/038; G06F 1/1632; G06F 1/1626; G06F 1/1616; G06F 13/385; G06F 13/387
USPC ..................................... 710/62, 73
See application file for complete search history.

(56) References Cited

U.S. PATENT DOCUMENTS

| | | | |
|---|---|---|---|
| 8,479,129 B1* | 7/2013 | Kalyanaraman et al. ..... | 716/106 |
| 2002/0054676 A1* | 5/2002 | Zhao et al. .................. | 379/354 |
| 2002/0157001 A1* | 10/2002 | Huang et al. ................ | 713/2 |
| 2003/0036843 A1* | 2/2003 | Okude et al. ................ | 701/200 |
| 2006/0294519 A1* | 12/2006 | Hattori et al. ............... | 718/1 |
| 2007/0070035 A1* | 3/2007 | Asbury et al. ............... | 345/156 |
| 2008/0177905 A1* | 7/2008 | Ohta et al. ................... | 710/14 |
| 2009/0319256 A1* | 12/2009 | Chow et al. .................. | 703/26 |
| 2010/0115254 A1* | 5/2010 | Deng .................. | G06F 9/44505 713/1 |
| 2012/0066681 A1* | 3/2012 | Levy et al. .................. | 718/1 |

OTHER PUBLICATIONS

"Dell Laptops Use Hybrid Processor, OS Solutions," http://archive.news.softpedia.com/news/Dell-Laptops-Use-Hybrid-Processor-OS-Solutions-104367.shtml, Feb. 12, 2009.*
"Dell Laptops Use Hybrid Processor, OS Solutions," Feb. 12, 2009, http://news.softpedia.com/news/Dell-Laptops-Use-Hybrid-Processor-OS-Solutions-104367.shtml.*

* cited by examiner

*Primary Examiner* — Farley Abad
(74) *Attorney, Agent, or Firm* — Ference & Associates LLC

(57) ABSTRACT

Systems, methods and products directed toward switching device components between multiple operating environments available on an information handling device. One aspect includes switching operation of an information handling device between at least two operating environments responsive to a trigger event, the at least two operating environments comprising a primary and a secondary operating environment; and switching one or more device components from one of the at least two operating environments to the other of the at least two operating environments via a virtual switch operation facilitated by one or more embedded controllers disposed within the information handling device responsive to switching between the at least two operating environments. Other embodiments are described herein.

19 Claims, 4 Drawing Sheets

VIRTUAL SWITCHING OF INFORMATION HANDLING DEVICE COMPONENTS

BACKGROUND

The two major information handling device operating environments are the conventional computing device (for example, personal or laptop computer) ecosystem and the mobile device (for example, smartphone or tablet computing device) ecosystem. The conventional computing device ecosystem is generally comprised of a personal or laptop computer form factor housing a Win-Tel platform, for example, a platform comprised of an Intel x86 compatible processor capable of running a Microsoft WINDOWS operating system, such as WINDOWS 7 operating system. WINDOWS 7 is a registered trademark of Microsoft Corporation in the United States and/or other countries.

The mobile device ecosystem is generally configured to run on lower powered processors and lighter weight operating systems specially designed for smaller devices (e.g., devices capable of "hand-held" operation). A popular example of a mobile operating system is the ANDROID operating system, which has been used as the operating system for mobile devices such as smartphones, netbooks, and tablet computers. A prominent processor family for these smaller mobile devices, such as a tablet computer, is the ARM series of processors, such as the SNAPDRAGON BY QUALCOMM CPU. ANDROID is a registered trademark of Google Incorporated in the United States and/or other countries. SNAPDRAGON BY QUALCOMM is a registered trademark of Qualcomm Incorporated in the United States and/or other countries.

Information handling devices come in a variety of forms including for example laptop computers, slate/tablet computers, smart phones, and the like. Tablet computers and laptop computers are different on many levels. Tablet or slate computers are generally smaller and more lightweight than laptop computers, often consisting only of a single component. Tablet computers integrate the display with the typical lower base portion of a laptop/clamshell computer, usually lack a physical keyboard, and often utilize a touch screen as an input device.

In addition to structural differences, tablet and laptop computers also differ with respect to their internal software and hardware configurations. The typical laptop computer form factor houses a Win-Tel platform, comprised of an Intel x86 compatible processor and is capable of running a Microsoft WINDOWS operating system, such as WINDOWS 7 operating system. In comparison, tablet computers include a light weight platform and are most likely to run on lower powered processors and lighter weight operating systems specially designed for smaller devices. The lighter weight operating systems are often referred to as mobile operating systems, and are optimized for touch and content consumption instead of running large applications, such as the full version of the Microsoft WORD document processing application. A popular example of a mobile operating system is the ANDROID operating system, which has been used as the operating system for mobile devices such as smartphones, netbooks, and tablet computers. A prominent processor family for these smaller mobile devices, such as a tablet computer, is the ARM series of processors, such as the SNAPDRAGON BY QUALCOMM CPU. WINDOWS 7 is a registered trademark of Microsoft Corporation in the United States and/or other countries. ANDROID is a registered trademark of Google Incorporated in the United States and/or other countries. SNAPDRAGON BY QUALCOMM is a registered trademark of Qualcomm Incorporated in the United States and/or other countries.

Conventional computing device and mobile device operating environments each have their own set of advantages. For example, advantages for mobile devices operating environments include mobility, size, and increased energy efficiency, while primary reasons for preferring conventional computing devices include increased processing power and battery size.

BRIEF SUMMARY

In summary, one aspect provides an information handling device comprising: one or more processors; one or memories storing program instructions accessible by one or more processors; wherein, responsive to execution of the program instructions accessible by the one or more processors, the one or more processors are configured to: ascertain a trigger event for switching between at least two operating environments configured to operate the information handling device, the at least two operating environments comprising a primary and a secondary operating environment; and switch one or more device components from one of the at least two operating environments to the other of the at least two operating environments via a virtual switch operation facilitated by one or more embedded controllers disposed within the information handling device responsive to switching between the at least two operating environments.

Another aspect provides a method comprising: switching operation of an information handling device between at least two operating environments responsive to a trigger event, the at least two operating environments comprising a primary and a secondary operating environment; and switching one or more device components from one of the at least two operating environments to the other of the at least two operating environments via a virtual switch operation facilitated by one or more embedded controllers disposed within the information handling device responsive to switching between the at least two operating environments.

A further aspect provides a program product comprising: a storage medium having program code embodied therewith, the program code comprising: program code configured to switch operation of an information handling device between at least two operating environments responsive to a trigger event, the at least two operating environments comprising a primary and a secondary operating environment; and program code configured to switch one or more device components from one of the at least two operating environments to the other of the at least two operating environments via a virtual switch operation facilitated by one or more embedded controllers disposed within the information handling device responsive to switching between the at least two operating environments.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Embodiments provide for a hybrid computing system comprising a primary environment (PE) (for example, a conventional computing device platform, such as a Win-Tel platform) and a secondary environment (SE) (for example, a mobile device platform, such as an ANDROID platform) in a single computing system. The hybrid computer system includes various features, as described further herein. In and among other features, embodiment support virtual switching of device components between operating environments, for example, facilitated through a device embedded controller.

Figure 1:
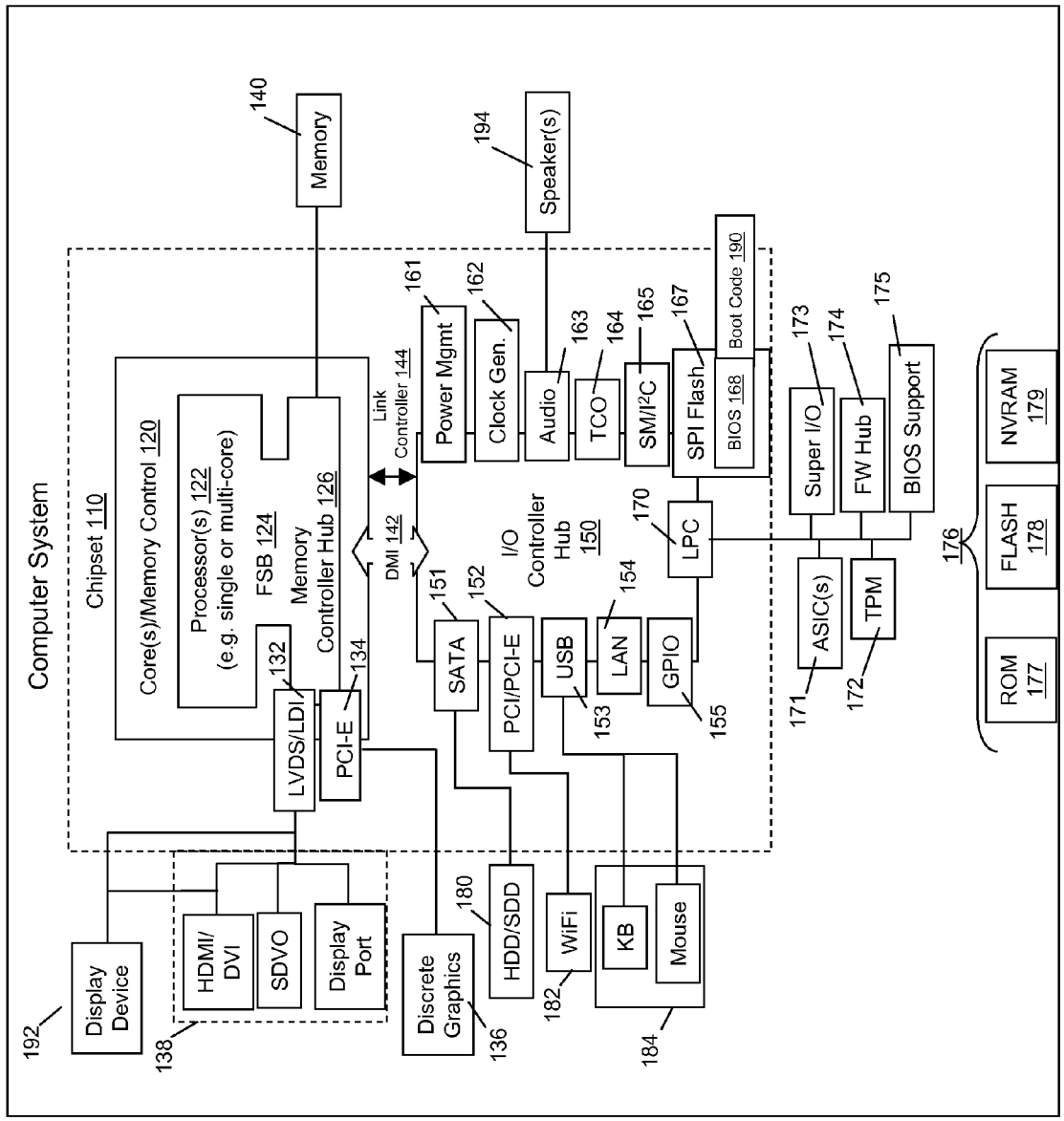
FIG. 1 illustrates an example circuitry of an information handling device system.

While various other circuits, circuitry or components may be utilized, FIG. 1 depicts a block diagram of one example of Win-Tel type information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, et cetera). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCIe interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 167, which can include BIOS 168 and boot code 190. The I/O hub controller 150 may include gigabit Ethernet support.

The system, upon power on, may be configured to execute boot code 190 for the BIOS 168, as stored within the SPI Flash 167, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
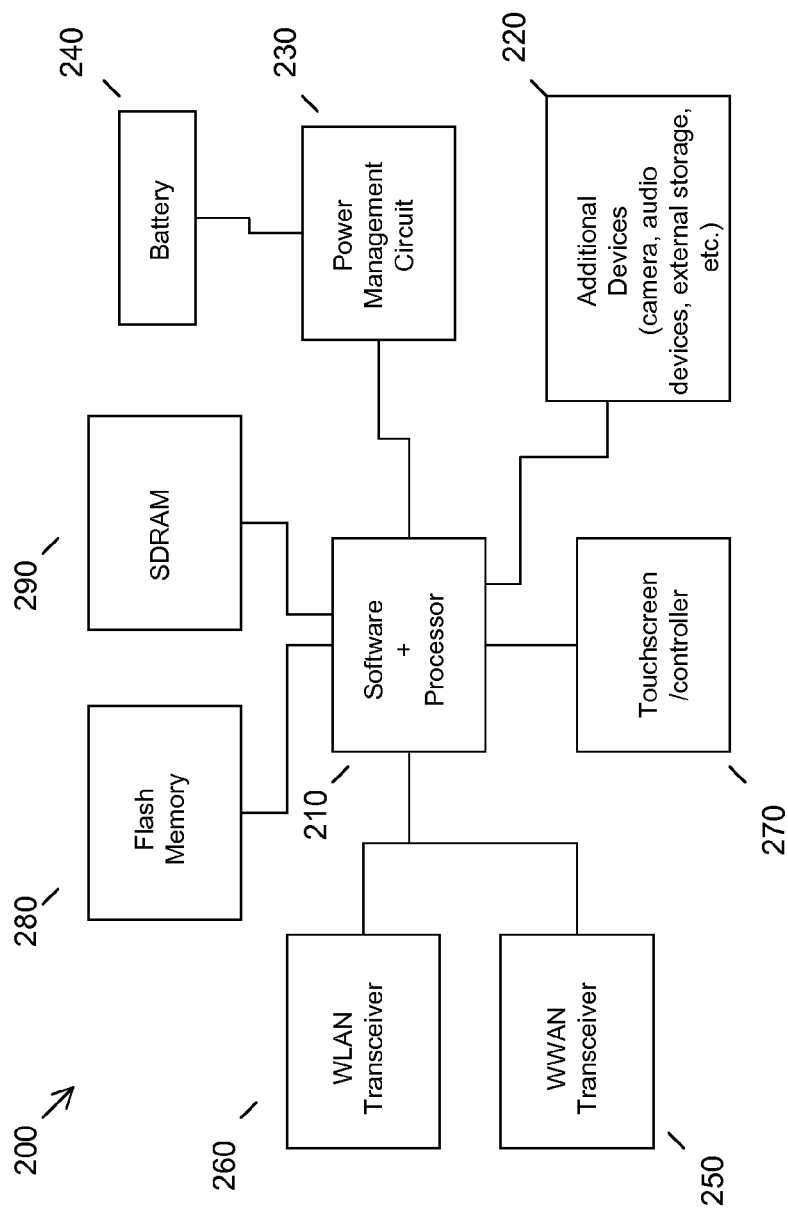
FIG. 2 illustrates another example circuitry of an information handling device system.

Referring to FIG. 2, with regard to smart phone and/or tablet circuitry 200, an example includes an ARM based system design, with software and processor(s) combined in a single chip 210. Internal busses and the like depend on different vendors, but essentially all the peripheral devices (220) may attach to a single chip 210. In contrast to the circuitry illustrated in FIG. 2, the tablet circuitry 200 may combine the processor, memory control, and I/O controller hub all into a single chip 210, commonly referred to a "system on a chip" (SOC). Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, may be used to supply BIOS like functionality and DRAM memory.

ARM based systems 200 typically include one or more wireless transceivers, including, but not limited to, WWAN 260 and WLAN 250 transceivers for connecting to various networks, such as telecommunications networks and wireless base stations. Commonly, an ARM based system 200 will include a touchscreen 270 for data input and display. ARM based systems 200 also typically include various memory devices, for example flash memory 280 and SDRAM 290.

As described herein, embodiments combine components of FIG. 1 and FIG. 2 into a hybrid system. While various embodiments may take a variety of hybrid forms, FIG. 3 illustrates one example hybrid environment configured to support the tuning of a multi-band antenna through a standard system bus slot as provided according to embodiments described herein.

Figure 3:
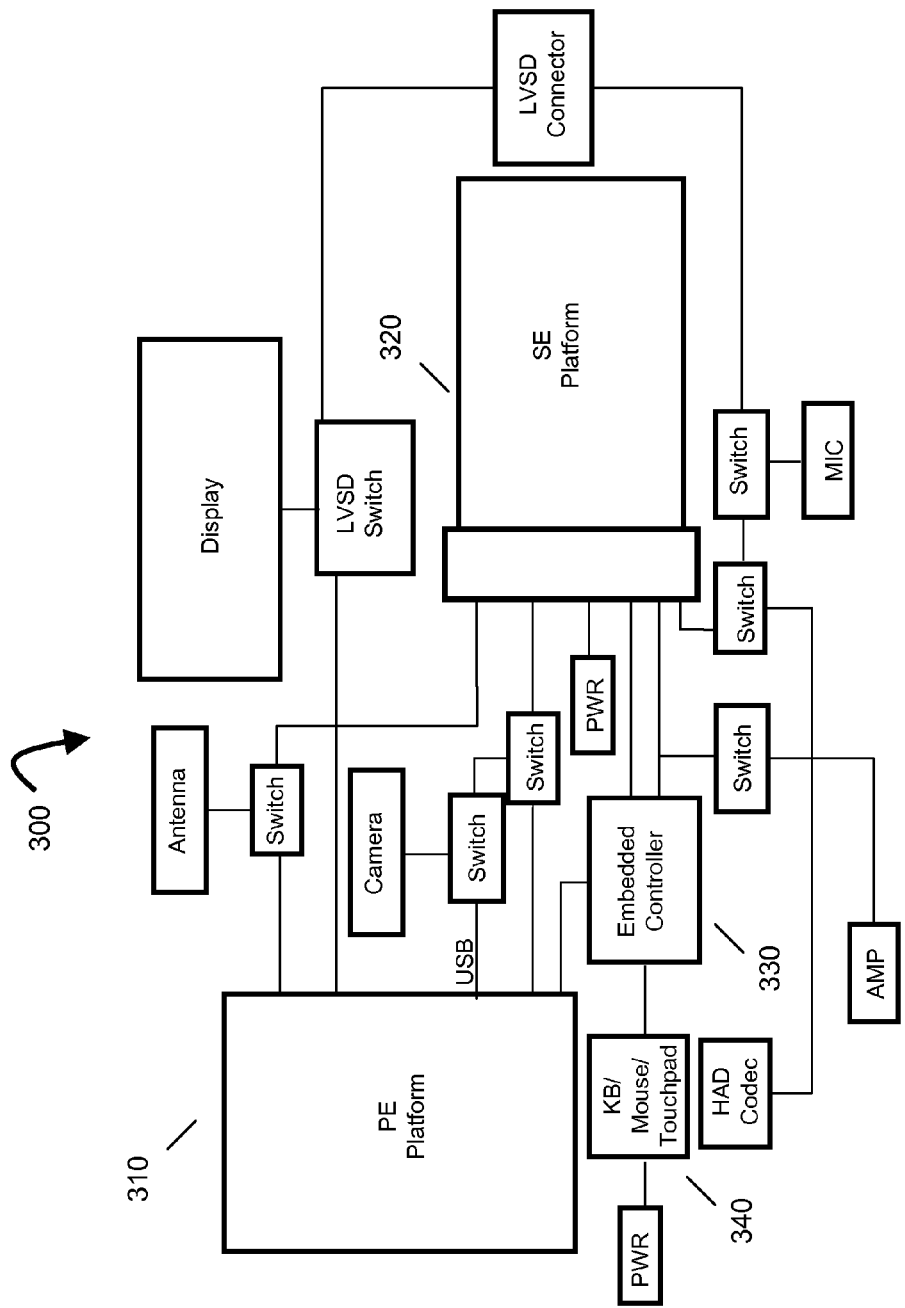
FIG. 3 illustrates an example hybrid information handling device environment.

FIG. 3 provides an illustration of an example embodiment of a hybrid information handling device 300 ("device"). The device 300 has at least two environments or states: a primary environment (PE) and a secondary environment (SE), supported by two platforms, 310 and 320, respectively. Thus, device 300 may include a PE platform 310 similar to that described in FIG. 1, and a SE platform 320 such as that described in FIG. 2. For example, an embodiment provides a PE in which a user experiences a WINDOWS operating environment or state, and a SE in which a user experiences an ANDROID operating environment or state. In a PE, the device 300 may thus operate according to a WINDOWS operating system. In a SE, the device 300 may operate according to an ANDROID operating system. According to an embodiment, a user may switch between these two states.

An embodiment provides that the hybrid computing device may be comprised of an embedded controller 330 that, inter alia, remembers the environment, SE or PE, that was previously active and may inform one environment (e.g., SE) that the other environment (e.g., PE) has changed state. A non-limiting example of an embedded controller is the H8 family of embedded controllers. H8 is a registered trademark of Hitachi, Ltd. In addition, as described further below, the embedded controller 330 may operate according to embodiments to handle the switching of one or more device 300 components or connected peripherals between operating environments.

The device 300 may include a display and input interfaces (for example, keyboard, mouse, touch interface, et cetera). Switching electronics (switches in FIG. 3) may be used to permit certain components to be used by either the PE or SE platforms 310, to be used by either the PE or SE platforms 310, 320, depending on which is the actual operating environment chosen by the user. Illustrative and non-restrictive examples of components controlled through switching electronics include display, touch interface, antenna, camera, microphone and similar peripheral components.

According to embodiments, one or more components may be switched through a virtual switching operation and not through switching electronics (switches in FIG. 3). Non-limiting examples of components that may be switched through a virtual switching operation include input devices such as a mouse, keyboard, touchpad, trackpad, clickpad, related switches and/or buttons, or combinations thereof 340. Embodiments provide that the embedded controller 330 may be configured to provide a virtual switching operation, comprising, for example, software, hardware, firmware, or combinations thereof, for switching one or more device components between operating environments. The virtual switching operation may be configured to redirect, for example, the data and signals associated with certain device components to the active operating environment.

Communications between PE platform 310 and the SE platform 320 may take place various levels. Control of machine-state, security and other related functions may be provided by an embedded controller 320 of the device 300. Communication links may use protocols like I2C or LPC. Higher bandwidth communications, such as used to move large amounts of data, for example video files, may use methods like USB, PCI express or Ethernet.

When the device 300 is in the SE mode or state, the device 300 operates as an independent tablet computer. As such, the SE platform 320 and the lightweight/tablet operating system executed therewith, such as an ANDROID operating system, control the operation of the device 300, including the display, peripherals such as a camera, microphone, speaker, shared wireless antenna, accelerometer, SD card, other similar peripheral devices, and software applications.

The device 300 utilizes the PE platform 310 when the user selects such an operational state, and this operational state may be set as a default or an initial state. When in the PE state, the device 300 is controlled by a PE platform 310, including for example a WINDOWS operating system. Essentially, the device 300 becomes a conventional laptop computer when PE platform 310 controls operation. As such, the SE platform 320 does not control device 300, peripherals, et cetera, when the device 300 is in the PE state, though an ANDROID operating system of SE platform 320 may be running in the PE state, as further described herein.

In such a hybrid environment, there are thus essentially two computing systems within one device 300, that is a primary system (PE), and a secondary system (SE). These systems may share access to various hardware, software, peripheral devices, internal components, et cetera, depending on the state (PE or SE). Each system is capable of operating independently.

Embodiments may be implemented in one or more information handling devices configured appropriately to execute program instructions consistent with the functionality of the embodiments as described herein. In this regard, FIGS. 1-3 illustrate non-limiting examples of such devices and components thereof. While mobile information handling devices such as tablet computers, laptop computers, and smart phones have been specifically mentioned as examples herein, embodiments may be implemented using other systems or devices as appropriate.

According to an embodiment, a user may switch between the PE and SE environments, for example, through one or more hardware or virtual switches that switch hardware from being controlled or physically attached to one environment to being controlled or physically attached to a second environment. Switched hardware may include, but is not limited to, a display, microphone, mouse, keyboard, touchpad, clickpad, microphone, storage devices, and USB devices. As a non-limiting example, components such as a display, microphone, storage devices, and USB devices may be switched between operating environments through one or more hardware switches, while components such as a mouse, keyboard, and touchpad may be switched between operating environments utilizing a virtual switch. Embodiments provide that when an environment (e.g., SE) is in control of the hybrid device, the other environment (e.g., PE) may be placed in a standby mode. As such, each environment may operate independently of the power state of the other environment.

Additional embodiments provide for switching responsive to one or more user actions, such as opening one or more applications, accessing a certain file type, connecting or disconnecting a device (e.g., camera), or responsive to one or more device states, such as a low battery state. A non-limiting example provides that the hybrid device may switch from the PE state to the SE state responsive to a user opening certain media files (e.g., a movie file), such that the user may execute the file in a lower-power environment.

Figure 4:
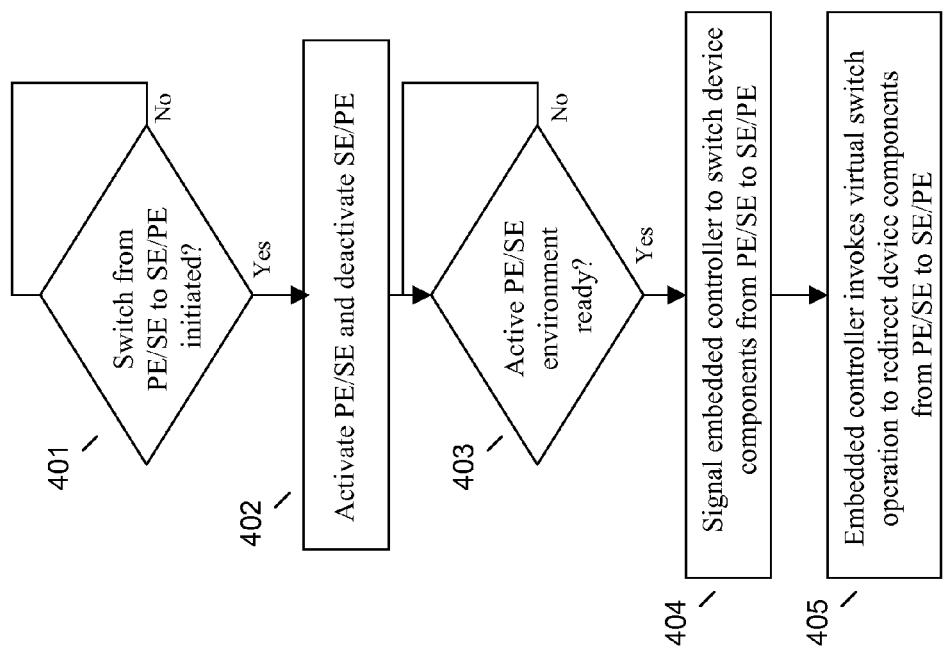
FIG. 4 provides an example process for virtual switching of device components between operating environments.

Referring now to FIG. 4, therein is provided an example process for virtual switching of device components between operating environments. The hybrid system monitors for a switch from one operating environment to the other 401. When a change is initiated 401, the hybrid system may activate the inactive operating environment (e.g., SE) and place the active operating environment (e.g., PE) into an inactive state, such as a sleep state 402. When the newly activated operating environment (e.g., SE) is ready 403, it may send a signal to the information handling device embedded controller to switch the device components to the newly activated operating environment (e.g., SE) 404. The embedded controller may invoke a virtual switch operation to redirect the data associated with the device components from the previously active and currently inactive operating environment (e.g., PE) to the newly activated operating environment (e.g., SE).

Although a device component may be switched from one operating environment to another, embodiments provide that one or more signals (e.g., keyboard selections) or data may be sent to both environments. In addition, certain hotkeys may be redirected according to embodiments, for example, based on priority (to one or both systems). Information handling devices and operating environments may have different keyboard mappings based on available components and features. For example, selecting the F1 key in the PE may invoke a certain function (e.g., a help function), while selecting the F1 key in the SE may invoke a different function. In addition, certain key functions and key combination functions are user selectable. Embodiments provide that the virtual switching operation may also function to re-map keys based on the mappings configured in each respective operating environment.

Certain device components may be associated with one or more selectable or modifiable configurations. As a non-limiting example, keyboard input devices may operate according to one or more layout configurations, for example, that pertain to certain languages (e.g., English, German, Japanese), regions (e.g., Europe, Asia), or other such standardized configurations (e.g., QWERTY, Dvorak, etc.). According to embodiments, the configurations of certain hybrid device components may be communicated across environments.

For example, if a user selects a keyboard layout in the PE, then that layout may be communicated to the SE, and vice versa, such that the layout may be maintained when switching between operating environments. For example, an embedded controller, BIOS, or some combination thereof, may keep track of user selected configurations, such as keyboard layouts, and may adjust device operation accordingly. Conventional WINDOWS operating systems, such as a WINDOWS operating system of the PE, may request or provide access to a keyboard layout setting. However, many mobile operating systems, such as an ANDROID operating system of a hybrid computing device SE, may not provide this functionality. As such, embodiments provide a process for the SE to obtain the keyboard layout setting from the PE such that the keyboard layout of the hybrid computing device may be maintained across operating platforms. For example, scan codes or keyboard settings may be transferred from the PE to the SE (and vice versa). Although keyboard layout has been utilized as an example herein, embodiments are not so limited, as any device component (integral or peripheral) and any configurable setting that may operate according to embodiments is contemplated herein.

As will be appreciated by one skilled in the art, various aspects may be embodied as a system, method or computer (device) program product. Accordingly, aspects may take the form of an entirely hardware embodiment or an embodiment including software that may all generally be referred to herein as a "circuit," "module" or "system." Furthermore, aspects may take the form of a computer (device) program product embodied in one or more computer (device) readable medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device comprising:
a display device;
a primary operating environment having a memory and a first operating system;
a secondary operating environment having a memory and a mobile operating system;
the primary and secondary operating environments sharing the display device;
an embedded controller that accepts keyboard inputs, the embedded controller including:
one or more processors; and
a memory storing program instructions accessible by the one or more processors;
wherein, responsive to execution of the program instructions accessible by the one or more processors, the one or more processors:
ascertain, at the embedded controller, a trigger event for switching between the primary and the secondary operating environment;
switch, via the embedded controller, input of one or more device components from the primary operating environment to the secondary operating environment via a virtual switch operation; and
provide, from the primary operating environment, keyboard layout information to the secondary operating environment;
wherein the primary operating environment is implemented on a primary hardware platform; and
wherein the secondary operating environment is implemented on an independent mobile hardware platform which is other than the primary hardware platform.

2. The information handling device according to claim 1, wherein the one or more device components comprise a mouse.

3. The information handling device according to claim 1, wherein the one or more device components comprise a touchpad.

4. The information handling device according to claim 1, wherein the one or more device components comprise a keyboard.

5. The information handling device according to claim 4, wherein a plurality of keys arranged on the keyboard are mapped to a primary operating environment mapping responsive to switching to the primary operating environment and are mapped to a secondary operating environment mapping responsive to switching to the secondary operating environment.

6. The information handling device according to claim 4, wherein a keyboard layout associated with the keyboard is maintained between the at least two operating environments.

7. The information handling device according to claim 4, wherein responsive to the trigger event, one of the primary operating environment and the secondary operating environment is placed in a working state, and the other of the primary operating environment and the secondary operating environment is placed in a sleeping state.

8. The information handling device according to claim 7, wherein switching one or more device components comprises directing output from the one or more device components to an operating environment in a working state.

9. The information handling device according to claim 1, wherein the secondary operating environment is implemented on a secondary environment platform comprising a system on a chip architecture.

10. A method comprising:
switching operation of an information handling device between at least two operating environments responsive to a trigger event, the at least two operating environments comprising a primary and a secondary operating environment;
switching, via an embedded controller that accepts keyboard inputs, output of one or more device components from one of the primary operating environment to the secondary operating environment via a virtual switch operation; and
provide, from the primary operating environment, keyboard layout information to the secondary operating environment;
wherein the primary operating environment is implemented on a primary hardware platform including a memory and a first operation system; and
wherein the secondary operating environment is implemented on a secondary hardware platform which is other than the primary hardware platform and includes a memory and a mobile operating system.

11. The method according to claim 10, wherein the one or more device components comprise a mouse.

12. The method according to claim 10, wherein the one or more device components comprise a touchpad.

13. The method according to claim 10, wherein the one or more device components comprise a keyboard.

14. The method according to claim 13, wherein a plurality of keys arranged on the keyboard are mapped to a primary operating environment mapping responsive to switching to the primary operating environment and are mapped to a secondary operating environment mapping responsive to switching to the secondary operating environment.

15. The method according to claim 13, wherein a keyboard layout associated with the keyboard is maintained between operating environments.

16. The method according to claim 13, wherein responsive to the trigger event, one of the primary operating environment and the secondary operating environment is placed in a working state, and the other of the primary operating environment and the secondary operating environment is placed in a sleeping state.

17. The method according to claim 16, wherein switching one or more device components comprises directing output from the one or more device components to an operating environment in a working state.

18. The method according to claim 10, wherein the secondary operating environment is implemented on a secondary environment platform comprising a system on a chip architecture.

19. A program product comprising:
a storage device having program code embodied therewith, the program code comprising:
program code that ascertains, at an embedded controller that accepts keyboard inputs, a trigger event for switching between a primary and a secondary operating environment;
program code that switches, via the embedded controller, input of one or more device components from the primary operating environment to the secondary operating environment via a virtual switch operation; and program code that provides, from the primary operating environment, keyboard layout information to the secondary operating environment;

wherein the primary operating environment is implemented on a primary hardware platform including a memory and a first operation system; and wherein the secondary operating environment is implemented on a secondary hardware platform which is other than the primary hardware platform and includes a memory and a mobile operating system.

* * * * *